No. 671,290. Patented Apr. 2, 1901.
E. MÜLLER.
DUMPING WAGON.
(Application filed Dec. 7, 1900.)
(No Model.) 2 Sheets—Sheet 1.

WITNESSES
INVENTOR
Ernst Müller
BY
ATTORNEYS

No. 671,290. Patented Apr. 2, 1901.
E. MÜLLER.
DUMPING WAGON.
(Application filed Dec. 7, 1900.)

(No Model.) 2 Sheets—Sheet 2.

WITNESSES:
A. R. Appleman
T. B. Owens

INVENTOR
Ernst Müller
BY
ATTORNEYS

THE NORRIS PETERS CO., PHOTO-LITHO., WASHINGTON, D. C.

UNITED STATES PATENT OFFICE.

ERNST MÜLLER, OF NEW YORK, N. Y.

DUMPING-WAGON.

SPECIFICATION forming part of Letters Patent No. 671,290, dated April 2, 1901.

Application filed December 7, 1900. Serial No. 39,073. (No model.)

*To all whom it may concern:*

Be it known that I, ERNST MÜLLER, a citizen of the United States, and a resident of the city of New York, borough of Bronx, in the county and State of New York, have invented a new and Improved Dumping-Wagon, of which the following is a full, clear, and exact description.

This invention relates to a dumping-wagon which I have constructed with certain novel features tending to improve the manner of framing the bed of the wagon and of mounting the dumping-body thereon.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
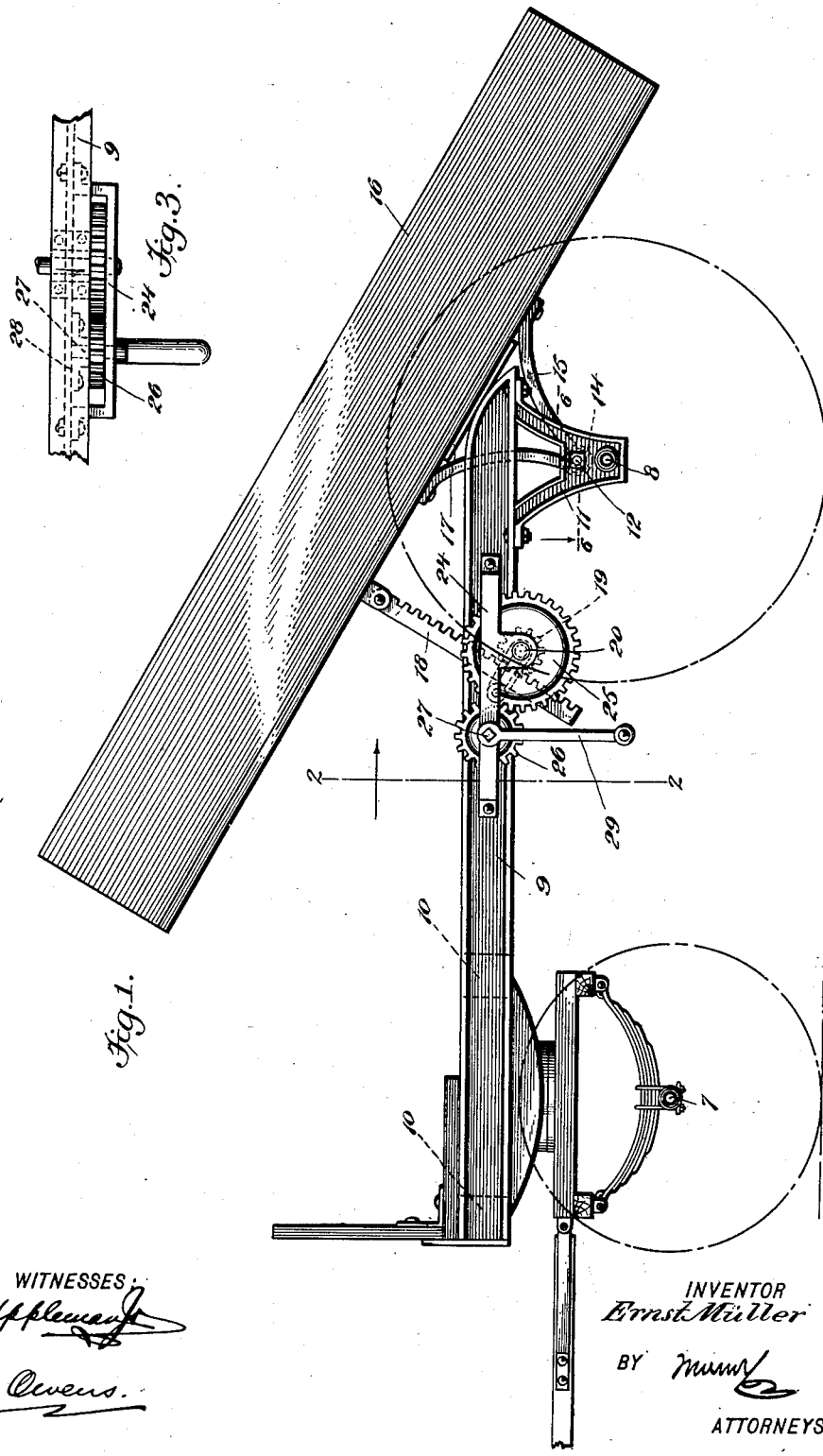
Figure 2:
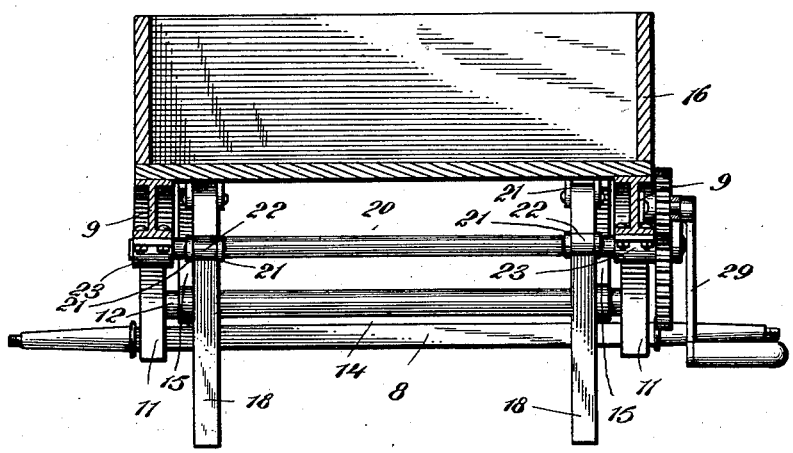
Figure 4:
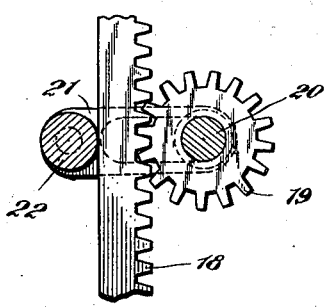
Figure 5:
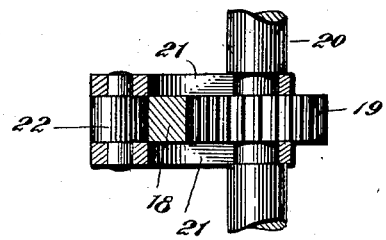
Figure 6:
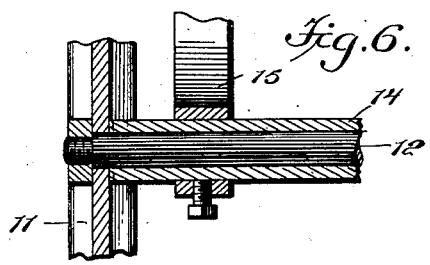

Figure 1 is a side elevation of the invention with the wheels removed. Fig. 2 is a transverse section substantially on the line 2 2 of Fig. 1. Fig. 3 is a fragmentary plan view showing part of the frame and of the gearing thereon. Fig. 4 is an enlarged partly-sectional elevation showing the rack and pinion for raising and lowering the bed. Fig. 5 is a partly-sectional plan of the same parts; and Fig. 6 is an enlarged sectional plan view substantially on the line 6 6 in Fig. 1, illustrating the manner of mounting the brackets which carry the dumping-body.

7 represents the front axle, and 8 the rear axle. The bed of the wagon is formed of two parallel longitudinally-extending I-beams 9, which are held spaced apart parallel with each other and rigidly fastened together at and near their front ends by transverse timbers 10. (Illustrated by dotted lines in Fig. 1.) The beams 9 constitute the side beams of the bed, and they extend rearward to a point just beyond the axle 8. These beams 9 are fastened to the axle 8 by means of brackets 11, which are secured rigidly to the under sides of the beams and attached to the axle in any suitable manner. By this arrangement the parts 8, 11, and 9 are held rigidly together. The front axle 7 is connected with the bed of the wagon by mechanism of any desired sort to permit the proper movement of the axle in turning the wagon, all of which will be understood.

Fastened rigidly to and extending between the brackets 11, just above the axle 8 and parallel therewith, is a shaft 12, on which is fitted to turn freely a pipe 14. (See Fig. 6.) To this pipe 14 are rigidly fastened brackets 15, which are located between the brackets 11 and the beams 9 and to which the under side of the wagon-body 16 is firmly secured. By this arrangement the body 16 is mounted to rock around the axis of the shaft 12, so as to occupy a horizontal position for carrying a load or to occupy an inclined position for dumping it. The purpose of providing the shaft 12 and the pipe 14 to turn thereon is to assist in strengthening the connection between the parts 11 and the members attached thereto and also to provide a very strong means of rockably mounting the body.

The rear ends of the beams 9 are rounded downward, as shown in Fig. 1, and the bottom of the body is provided with wear-plates 17, which bear, respectively, on the rounded rear ends of the beams 9. These rounded portions of the beams are formed with an arc-shaped curve, the center of which arc is coincident with the axis of the shaft 12. Consequently when the body 16 is rocking it bears at all times upon the convex portions of the beams 9, which serve to assist in supporting the body. It will therefore be seen that the weight of the body is evenly distributed throughout the various parts of the wagon, and this enables me to carry great loads upon the body without danger of breaking the wagon and also without requiring great force to move the body from one position to another. When the body is at rest, the wear-plates 17 bear flat upon the beams 9, which in this case bear the major portion of the load of the vehicle.

For raising and lowering the body I provide two racks 18, which are pivotally mounted on the under side of the wagon-body and which are in mesh with pinions 19, fastened on a shaft 20. The racks 18 are held properly engaged with the pinions by means of links 21, which loosely embrace the shaft 20 and are respectively located at the sides of the pinion 19. These links 21 carry at their outer ends an antifriction-roller 22, bearing against the front edge of the racks, thereby holding the racks engaged with the pinions and at the same time allowing free movement of the racks between the links 21. The shaft 20 is mounted to turn freely in boxes 23, fastened to the under sides of the beams 9. (See Fig. 2.) The left-hand end of the shaft 20 projects beyond the corresponding beam 9 and is mounted in a bracket 24, attached to the outer side of the beam. This end of the shaft 20 carries a spur-gear 25, meshing with a pinion 26, which is fast on a short shaft 27, mounted in the bracket 24, and in a box 28, attached to the outer side of the I-beam 9. A crank 29 is provided for the shaft 27 to operate the same. By turning the shaft 27 movement is imparted to the shaft 20 and the body of the wagon may be moved up or down, as desired.

Having thus described my invention, I claim as new and desire to secure by Letters Patent—

1. A dumping-wagon having a bed comprising longitudinally-extending side beams, a front axle mounted under the bed, brackets attached to the rear portions of the side beams and extending downward, a rear axle carried in the brackets, a shaft extending rigidly between the brackets, a tube mounted to turn on the shaft, a dumping-body bearing on the side beams, and means for mounting the body on the tube, for the purpose specified.

2. A dumping-wagon, having a bed, brackets extending downward therefrom, an axle mounted in the brackets, a wagon-body, a shaft extending between the brackets above the axle and parallel therewith, and brackets mounted to rock on the shaft and carrying the wagon-body.

3. A dumping-wagon, comprising a bed, brackets extending downward therefrom, an axle mounted in the brackets, a shaft extending rigidly between the brackets at a point above the axle, a tube mounted to turn on the shaft, and a dumping-body having means for attaching it to said tube, for the purpose specified.

4. A dumping-wagon, having a bed comprising longitudinally-extending side beams, a wagon-body mounted on the side beams and adapted to roll thereon in the dumping operation, brackets attached to the side beams and projecting downward therefrom, a rear axle supported by the brackets, additional brackets attached to the body and extending downward alongside of the brackets of the bed, and a shaft extending between and supported by the bed-brackets, on which shaft the body-brackets are mounted.

5. A dumping-wagon, comprising a bed, brackets extending downward therefrom, a shaft extending rigidly between the brackets, a tube mounted to turn on the shaft, and a dumping-body having means for attaching it to the tube, for the purpose specified.

In testimony whereof I have signed my name to this specification in the presence of two subscribing witnesses.

ERNST MÜLLER.

Witnesses:
  I. B. OWENS,
  JNO. M. RITTER.